United States Patent [19]
Muncy

[11] Patent Number: 5,490,340
[45] Date of Patent: Feb. 13, 1996

[54] ROOT GRUBBER

[76] Inventor: Robert G. Muncy, 4400 W. 10th, Odessa, Tex. 79763

[21] Appl. No.: 299,197

[22] Filed: Aug. 31, 1994

[51] Int. Cl.⁶ ................................................. A01B 13/00
[52] U.S. Cl. .................. 37/301; 37/302; 37/404; 172/698; 172/699; 172/720
[58] Field of Search ..................... 172/698, 699, 172/700, 19, 720, 725, 727, 752; 37/302, 303, 301, 403, 468, 404

[56] References Cited

U.S. PATENT DOCUMENTS

| | | | |
|---|---|---|---|
| D. 264,213 | 5/1982 | Hedblom | 37/302 X |
| 1,527,599 | 2/1925 | Martin | 172/698 |
| 3,048,229 | 8/1962 | Simpson | 172/678 |
| 3,243,904 | 4/1966 | Perry | 37/403 |
| 3,512,276 | 5/1970 | Juhl | 172/698 |
| 4,067,369 | 1/1978 | Harmon | 37/302 X |
| 4,271,611 | 6/1981 | Paul | 172/698 X |
| 4,321,761 | 3/1982 | Hedblom | 37/302 |
| 4,355,475 | 10/1982 | Harkness | 172/698 X |
| 4,517,755 | 5/1985 | Nicholson | 37/301 X |
| 4,895,211 | 1/1990 | Harris | 172/698 X |
| 5,067,261 | 11/1991 | Betts | 172/698 X |
| 5,133,268 | 7/1992 | Delisle | 37/302 |
| 5,141,385 | 8/1992 | Tibbatts et al. | 37/468 X |

*Primary Examiner*—Terry Lee Melius
*Assistant Examiner*—Victor Batson
*Attorney, Agent, or Firm*—Milburn & Peterson

[57] ABSTRACT

A root grubber tool for brush which is attached to the boom of an excavator, such as, a track excavator or backhoe. The tool includes a framework which has a pair of side members which support, at the lower end thereof, a cutting blade with its leading edge swept inward and downward to accommodate centering the cutting blade on the roots and providing a deeper cut at the center than at the edges. The framework includes mounting arms to secure the tool onto the boom for working the tool. The framework may include a cross support for assisting in gathering smaller brush. Also, the lower edges of the side members are bevelled to aid in the cutting operation. The tool may be maneuvered to depths of 18 to 24 inches to grub out the roots of the brush and secure it between the boom and the tool for displacement from the right-of-way.

8 Claims, 4 Drawing Sheets

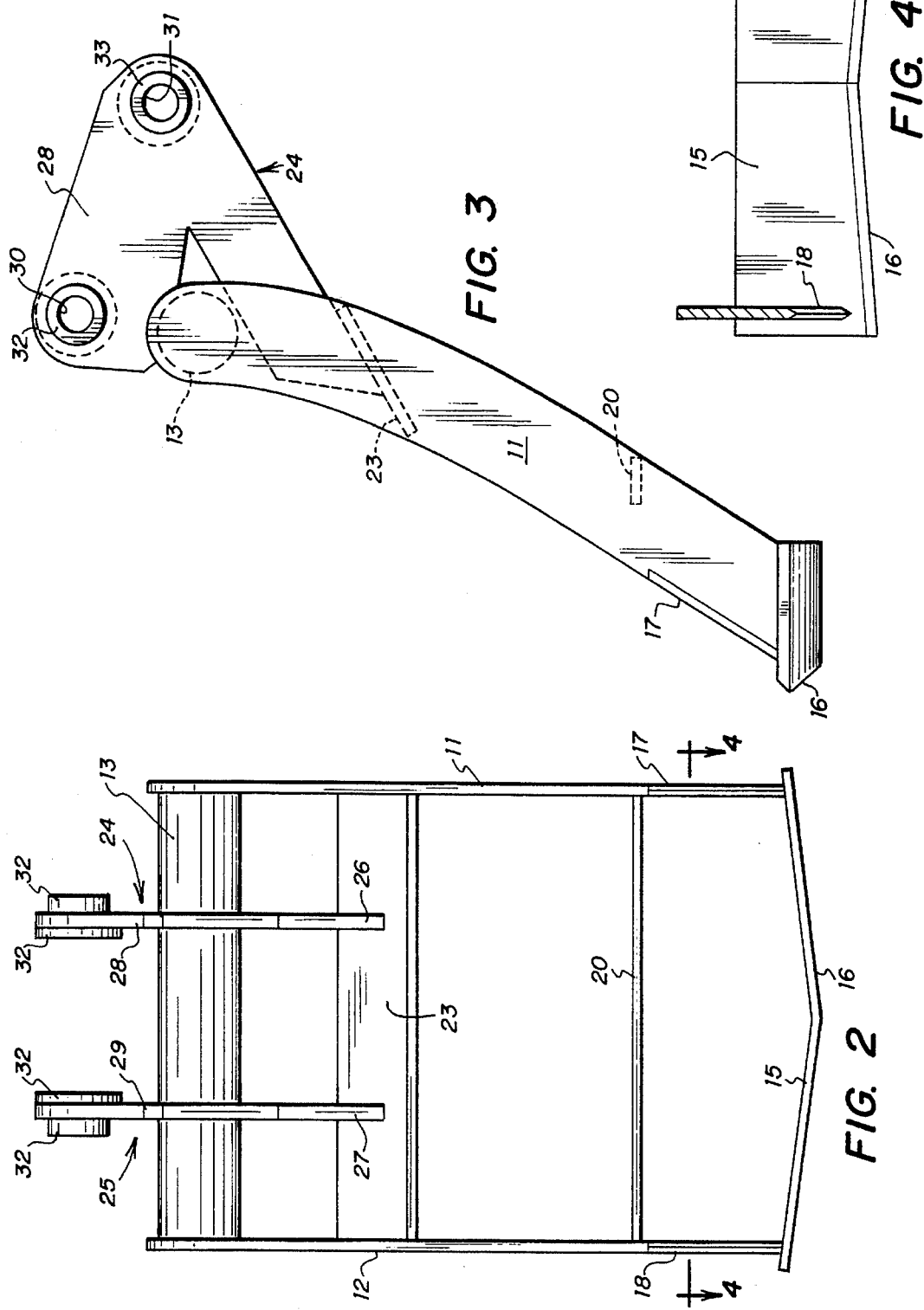

ROOT GRUBBER

BACKGROUND OF THE INVENTION

This invention generally relates to Root Grubbers, and more particularly to a root grubber which is readily attachable to a backhoe or track excavator where the bucket has been removed and has the ability to cut sufficient heavy roots to avoid regrowth.

Root Grubbers are utilized to remove brush and undergrowth from pipeline right-of-ways, railroad right-of-ways and in general clearing operations of land. Numerous root grubbers or root cutting equipment are designed for attachment to some kind of earth moving equipment, such as, backhoes, track excavators, and the like. In most cases the root grubbers have some kind of cutting blade which is mounted between a pair of parallel arms and is straight across or in some instances swept back. Other designs include a rake type tool having a number of tines spaced apart which have the drawback of not cutting the major roots of the underbrush. In some instances the rakes have arcuate tines which are either pushed through the underbrush or pulled through the underbrush.

Typical prior art designs of root grubbing and earth clearing tools are known, a number of which are hereinafter described.

U.S. Pat No. 2,154,970, granted to R. W. Briggs discloses a grubbing implement having a transverse beam and upstanding support legs. Removable v-shaped cutting blades are disclosed which provide a swept back design and are removable from the tool. The blades are in one plane only. Such a design has a tendency for the blades to be knocked sideways by large roots rather than cutting the roots.

U.S. Pat. No. 3,021,619, issued to C. C. McGee discloses an attachment for a bulldozer or other earth working equipment. The attachment has a series of spaced apart crescent shaped teeth. The lower end of the teeth are supported by a horizontal cutting bar.

U.S. Pat. No. 3,160,215, issued to W. R. Harrell discloses a blade mounting means for attachment to a bulldozer which provides a pair of vertical or upright cutting blades and a horizontal flat cutting blade. This arrangement provides no means for handling the brush or undergrowth after it is unearthed. The mounting includes ground engaging wheels which limit the depth of the horizontal blade below the surface.

U.S. Pat. No. 3,343,285, issued to D. W. Murray discloses a backhoe attachment for shearing roots and grabbing and pulling stumps. The attachment includes a plate between a pair of side frames with a shearing blade fixed to the lower underside of the plate, as well as, a bucket or scoop. In operation, the digging lip of the scoop provides a shearing action against the shearing blade upon engagement. The digging lip and shearing blade sever material which is sufficiently soft or grabs material which cannot be sheared. Murray is concerned primarily with excavating and not with root grubbing other than as necessary at the excavation site.

U.S. Pat. No. 4,010,805, issued to Leon Kelley discloses a flow through brush cutter mounted on a track vehicle with a flat blade having a replaceable v-shaped forward cutting edge for movement along a horizontal plane. The depth of the cutting blade may be raised or lowered from the track vehicle. The brush cutter is mounted at the rear of the track vehicle, thus, the track vehicle must traverse the path of the brush cutter in advance of the flat blade having the v-shaped cutting edge. The swept back design of the v-shaped cutting edge causes lateral movement of the brush cutter upon encounter with an obstruction to large to cut, however, Kelly provides guide assemblies which to some degree limit lateral displacement.

U.S. Pat. No. 3,967,397, issued to Harold Nault discloses a backhoe or tractor attachment for material handling. The attachment is used with a main frame and a swing frame pivotally mounted on said main frame for lateral and vertical swinging movement thereon. The attachment comprises a first member pivotally mounted on said swing frame, a rake operatively mounted on said first member and a cable or chain connected, on the one hand, to the free end of the first member and, on the other hand, to the swing frame, so that the first member is pivotally connected at one end to the swing frame and is suspended at the other end from the swing frame when the backhoe or tractor is in operation.

U.S. Pat. No. 3,595,416, issued to Floyd Perrotti discloses a front end loader having a bucket with a forked type attachment which is pivotably mounted to the bucket and can be raised or lowered, such that, the bucket can engage a log and the fork type clamp can be lowered against the log to hold it. The attachment is also designed for uprooting small trees or the like without sliding upwardly on them.

SUMMARY OF THE INVENTION

The present invention overcomes some of the prior art problems with root grubbers or similar tools which disclose blade structures where the leading edge of the blade is straight or swept back and allows the blade to undergo lateral displacement whenever it encounters an obstruction such as a large root or stone which would prevent its forward movement and cause a lateral displacement. It will also, be understood that brush, such as mesquite, has a cluster of roots which require severing without leaving enough underground root to regrow before the mesquite is removed. Applicants invention provides a brush cutter apparatus which may replace the bucket of either a backhoe or track excavator which is adaptable to get onto right-of-way areas where bulldozers and other heavy equipment could not be utilized.

The root grubber of the present invention includes a flow through tool which has a cutting blade with its leading edge swept inward and downward, such that, upon engagement with the roots of brush, centers the tool and provides a deeper cut at the center of the blade and a shallower cut near the outer edges of the blade. The lower portion of the side rails of the tool framework supporting the cutting blade are bevelled to provide sharp leading edges in the vertical plane to aid in the overall cutting operation of the brush roots. Further, in areas where the brush has not grown up, the tool construction is such that minimal disturbance of the earth's surface and grass on the right-of-way is maintained near the brush requiring removal such as mesquite. The cutting blade may have various shapes in both horizontal and vertical planes, such as, v-shaped, crescent shaped, u-shaped, etc., the important feature is centering the cutting blade on the root. The cutting blade, in general, is swept inward and downward to provide centering on the roots and a deeper center cut.

The framework may also include a cross support which aids in gripping the brush being removed between the tool and the boom of the excavating machine for ease of handling. In yet another aspect of the invention, the swept forward design of the cutting blade not only tends to center the tool at the main part of the roots, it also, prevents a large root from laterally displacing the tool and consequently not cutting the root.

In another embodiment the root grubber includes a cross plate spaced above the cutting blade with bevels similar to the side plates to form a cutting edge which may or may not be below the surface during operation.

It will be apparent that the present invention that the root grubber will permit the passage of small growth between the side plates and the cutting blade while catching the larger brush which can be grasp between the boom and the tool for displacement off of the right-of-way.

DESCRIPTION OF THE DRAWINGS

The present under invention may best be understood by referring to the detailed description hereinafter when taken in conjunction with the accompanying drawings, in which:

FIG. 2 is a front view of the root grubber tool in FIG. 1;

FIG. 3 is a side view of the root grubber tool of FIG. 1;

FIG. 4 is a sectional view taken along the lines 4—4 in FIG. 2 of the root grubber tool;

DETAILED DESCRIPTION OF THE INVENTION

Figure 1:
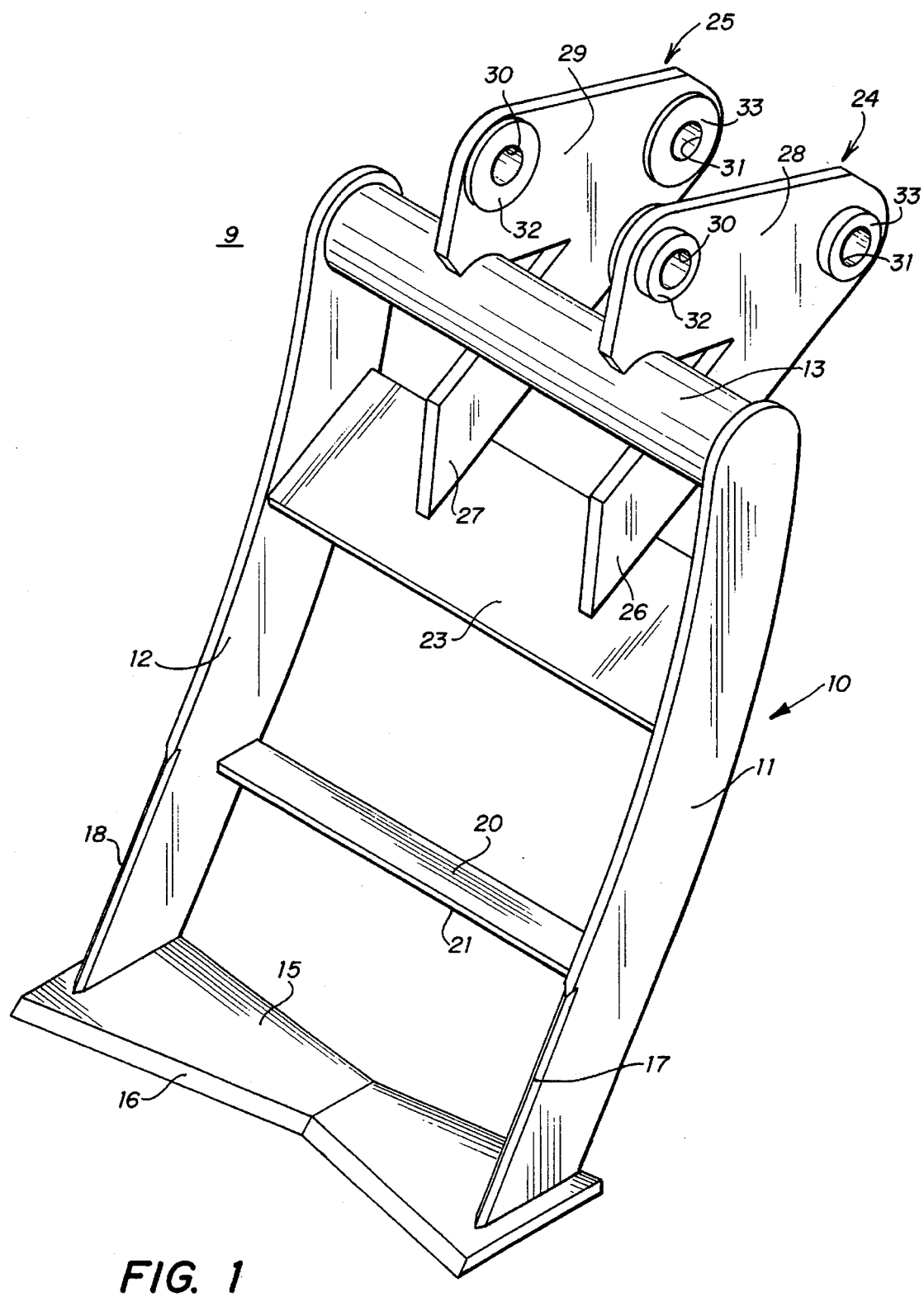
FIG. 1 is a perspective view of the root grubber tool for attachment to a track vehicle.

Referring now to the drawings and particular to FIGS. 1–4, a flow through root grubber tool 9 is provided for attachment to a track vehicle not shown. The root grubber tool 9 has a framework, generally, 10. Framework 10 includes a pair of arcuate side rails 11 and 12 with the upper ends joining with and spaced apart by a tubular member 13 and joining with and spaced apart by a v-shaped blade 15 at the lower or bottom ends of arcuate side rails 11 and 12. Blade 15 is attached to arcuate side rails 11 and 12, and extends beyond the arcuate side rails 11 & 12. The leading edge 16 of blade 15 is sharpened for cutting roots. Blade 15 is depressed near its center, thus, providing a greater cutting depth in the center. The leading or lower edges 17 and 18 of arcuate side rails 11 and 12 are bevelled to provide a cutting edge. Further, leading edges 17 and 18 each form an obtuse angle with the leading edge 19 of blade 15. A cross support 20 spans between side rail 11 and side rail 12 above the bevelled edges 17 and 18 of the tool. Cross support 20 may have leading edge 21 bevelled to provide an additional cutting edge for the root grubber tool. Side rails 11 and 12 of framework 10 carry a support plate 23. Brackets 24 and 25 have legs 26 and 27, respectively, which are secured to support plate 23. Additionally, the arms 28 and 29 of bracket 24 and 25, respectively, are welded to tubular member 13. The arm 28 and arm 29 of brackets 24 and 25, respectively, are provided with mounting holes 30 and 31 which are surrounded by bosses 32 and 33, respectively, to strengthen the mounting holes 30 and 31.

Figure 5:
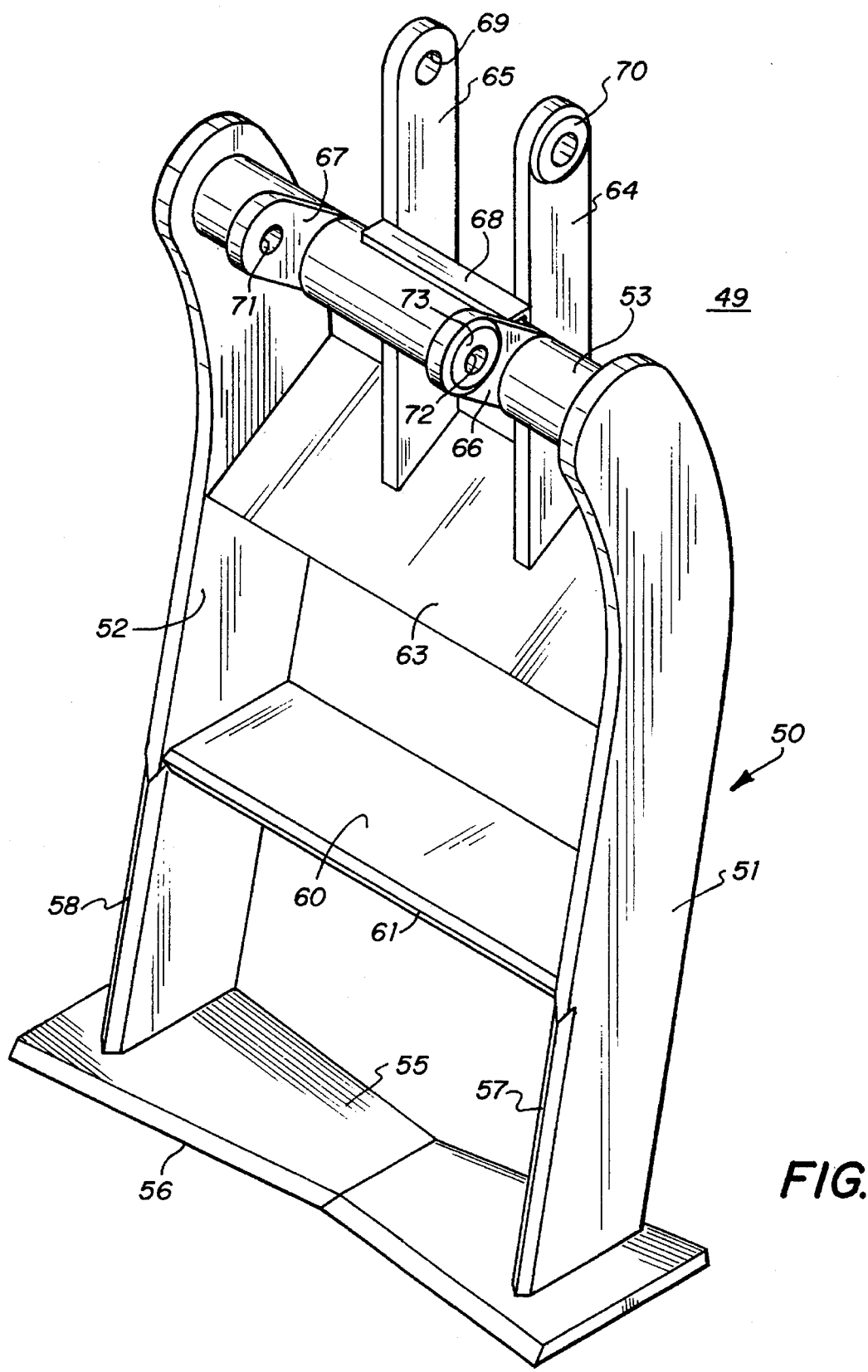
FIG. 5 is a perspective view of the root grubber tool for attachment to a backhoe.
Figure 6:
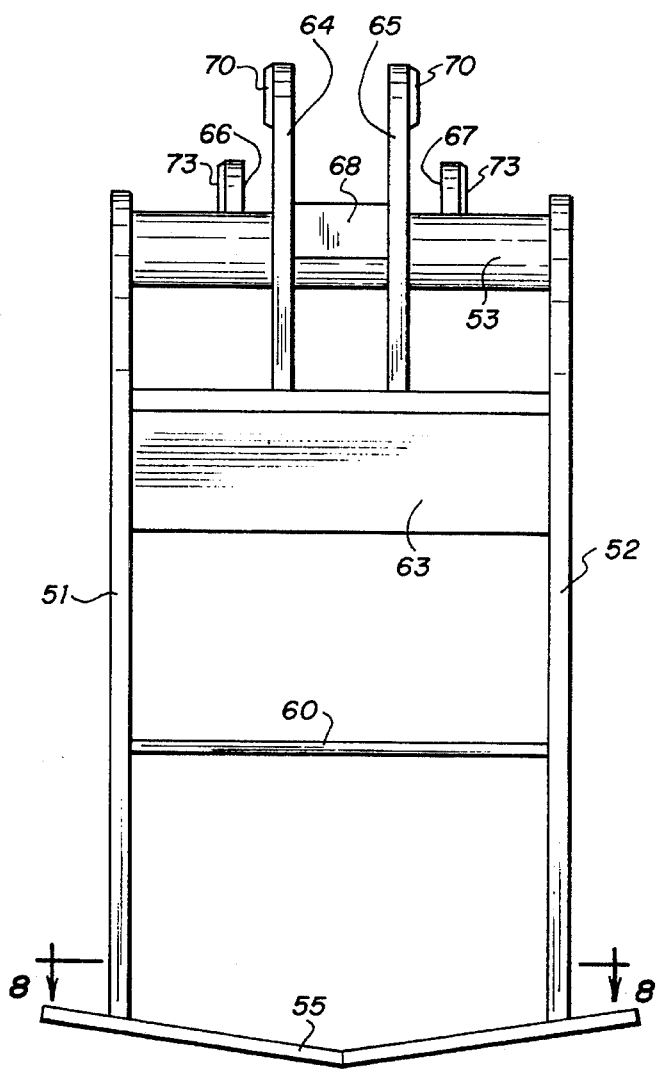
FIG. 6 is a rear view of the root grubber tool of FIG. 5.
Figure 7:
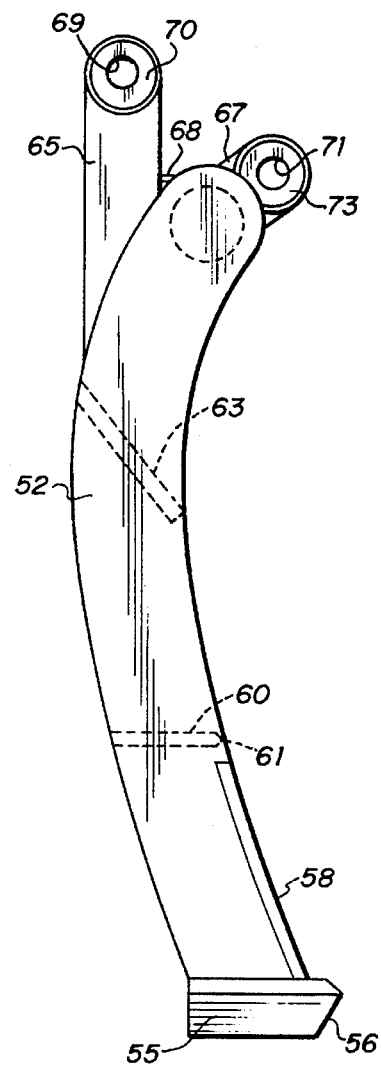
FIG. 7 is a side view of the root grubber tool in FIG. 5.
Figure 8:
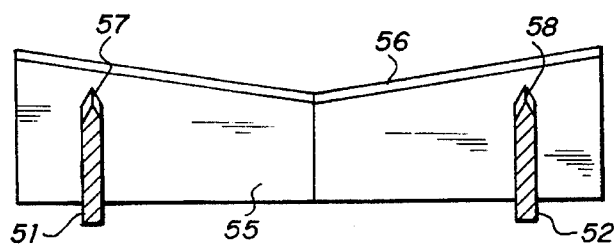
FIG. 8 is a cross sectional view of the root grubber taken along section 8—8 in FIG. 6.

In another embodiment of the invention, referring to FIGS. 5–8, root grubber tool 49 is designed for attachment to a backhoe replacing the bucket. The root grubber tool 49 has a framework, generally, 50. Framework 50 includes a pair of side rails 51 and 52 with the upper ends joining to a tubular member 53, and has a forward swept v-shaped blade 55 joining at the lower or bottom end of side rails 51 and 52. Blade 15 is depressed in the center, thus, providing a deeper cut in the center. The leading edge 56 of blade 55 is sharpened to form a cutting edge which is suitable for severing roots. In addition lower edges of side rails 51 and 52 are bevelled to form cutting edge 57 and 58. A cross support 60 spans the side rail 51 and side rail 52 above the bevelled cutting edges 57 and 58. Cross support 60 may have leading edge 61 bevelled for ease of passage through the earth or to cut brush. Also, cross support 60 permits the tool 49 to hold smaller brush between the tool 49 and the boom of the backhoe (not shown). Side rails 51 and 52 include a support plate 63. Tubular member 52 has a pair of pivot arms 66 and 67 including apertures 71. Apertures 71 have bosses 73 to reinforce the aperture. An angle bracket 68 is affixed to tubular member 53 between pivot arms 66 and 67. A pair of control arms 64 and 65 are secured to support plate 63 and are secured to and extend beyond angle bracket 68. Control arms 64 and 65 include apertures 69 which are surrounded by bosses 70 to strengthen control arms 64 and 65.

In operation of the root grubber tool in FIGS. 1–4, the root grubber tool 9 for track excavators is attached to the boom of a track excavator by a tubular member (not shown) extending between mounting holes 30 of brackets 24 and 25 and to the hydraulic piston for rotating the tool on the end of the boom by tubular member (not shown) extending through mounting holes 31 of brackets 24 and 25. In operation the root grubber tool 9 is pivoted such that blade 15 engages the ground near the brush to be removed and penetrates to a depth of approximately 18 to 24 inches to engage the root of the brush to be removed. Initial engagement of root grubber tool with the ground is along the outer edges of leading edge 16 and as penetration of the earth progresses leading edges 17 and 18 of arcuate side rails 11 and 12 engage the ground progressively from the lower end of side rails 11 and 12. Cross support 20 is set back from leading edges 17 and 18 may be beveled to form a cutting edge to engage the root for gripping between the track excavator boom and grubber tool 9. The root grubber tool 9 is maneuvered similar to the bucket of a track excavator, by maneuvering the boom of the track excavator and the position of the tool the brush may be picked up and placed to the side of the right-of-way or other disposal area.

The operation of the root grubber tool in FIGS. 5–8, the root grubber tool 49 is attached to the boom of a backhoe in which the bucket has been removed, and may be maneuvered in the same manner as the bucket on the backhoe. The root grubber tool 49 is mounted to the fixed pivot on the backhoe with a tubular member (not shown) spanning apertures 71 and 72 of pivot arms 66 and 67, and the moveable pivot from the hydraulic cylinder is secured through apertures 69 in control arms 64 and 65. The root grubber tool 49 for attachment to the backhoe is utilized in the same manner as the root grubber tool attached to a track excavator.

The main cutting blade for the root grubber tool of the present invention may be stainless steel or high carbon steel, however if high carbon steel is used the leading edge of the cutting blade should be made of stainless steel to increase wear resistance and the remaining portions of the root grubber may be made of carbon steel.

It will be understood that other means of attaching the root grubber tool to a prime mover, such as, a track excavator or a backhoe could be utilized, so long as, the arrangement provided pivotable movement of the tool relative to the boom of a prime mover. It should be further understood that bevelling the lower portion of the side rails of the root grubber tool and the cross support would facilitate the movement of the root grubber through the earth with a minimal of surface disruption. However, it is not essential that these areas of the tool be bevelled. The tool may have a cutting blade of various designs so long as the blade is self-centering. It is also desirable but not essential that the blade extend down lower in the center than at the sides.

What is claimed is:

1. A root grubber tool for attachment to the boom of an excavator or similar earth working machine comprising:
   a spaced apart pair of arcuate side members, each having an upper end, a lower end and a leading edge at the lower end;
   a cutting blade with a leading edge mounted beneath the lower ends of said pair of arcuate side members extending outboard of said pair of arcuate side members, said cutting blade extending beyond the leading edges of said pair of arcuate side members and forming an obtuse angle therewith, and said cutting blade swept centrally inward relative to the leading edges of said pair of arcuate side members to form an obtuse angle along the leading edge of said cutting blade and swept centrally downward to form an obtuse angle with each of said pair of arcuate side members;
   a mounting section for attachment of the tool to the boom of the excavator secured between the upper ends of said pair of arcuate side members;
   a support plate extending between said pair of arcuate side members intermediate said mounting section and said cutting blade;
   a pair of mounting brackets secured to said mounting section and said support plate, said mounting brackets arranged to allow coupling of the root grubber tool to the excavator for arcuate movement of the tool relative to the boom and excavator.

2. The root grubber tool of claim 1 wherein a retainer plate extends between said pair of side members above the cutting blade and below the support plate.

3. The root grubber tool of claim 1 wherein said mounting section is a tubular member.

4. A root grubber tool for attachment to the boom of a backhoe or similar earth working machine comprising:
   a generally rectangular framework having a pair of arcuate side members, and having a top member;
   a pair of attachment arms secured to said top member for removably coupling the root grubber tool to the boom;
   a v-shaped cutting blade forming the bottom of said framework, said blade having a leading edge swept inward for centering the tool on brush roots with the deepest engagement at the center of the blade, said leading edge of said pair of said side members forming an obtuse angle relative to the leading edge of said cutting blade.

5. A root grubber tool for attachment to the boom of an excavator or similar earth working machine for clearing brush from a right-of-way comprising:
   a framework having a top section, a pair of spaced apart arcuate side members, each with an upper segment and a lower segment with a leading edge, a cutting blade with a leading edge distal from said top section spanning the lower segment of each side member and footed thereto with its leading edge at an obtuse angle with the leading edge of the lower segment of each side member, said cutting blade tapered centrally downward from the lower segment of each side member forming an obtuse angle and having the leading edge tapered centrally inward forming an obtuse angle;
   a support plate spanning said pair of arcuate side members intermediate said top section and said cutting blade; and
   a pair of mounting brackets secured to said top section and said support plate for coupling the tool to the boom of the excavator for working the tool.

6. The root grubber tool of claim 15 wherein said framework includes a cross member extending between said pair of side members intermediate the cutting blade and said support plate for preventing brush from passing through the framework.

7. The root grubber tool of claim 6 wherein the side members adjacent the cutting blade and below the cross member are bevelled to provide cutting edges.

8. A method of removing unwanted brush and its roots from the earth utilizing an excavator with a boom comprising:
   mounting a framework to the boom of the excavator, said framework including a pair of arcuate side members, a cutting blade with a leading edge extending between said pair of arcuate side members distal from the boom, the leading edge of said cutting blade tapered centrally inward forming an obtuse angle and said cutting blade tapered centrally downward forming an obtuse angle with each arcuate side member for centering the cutting blade on brush roots with the deepest engagement at the center of the cutting blade;
   maneuvering the framework and the cutting blade in an arcuate motion through the ground at a sufficient depth to engage and sever the brush roots;
   gripping the severed brush and roots between the framework and the boom of the excavator; and
   discharging the severed brush and roots off the earth.

* * * * *